United States Patent
Chen et al.

(10) Patent No.: US 12,003,729 B2
(45) Date of Patent: Jun. 4, 2024

(54) IN-LOOP FILTERS FOR VIDEO CODING

(71) Applicant: BEIJING DAJIA INTERNET INFORMATION TECHNOLOGY CO., LTD., Beijing (CN)

(72) Inventors: Yi-Wen Chen, Beijing (CN); Xiaoyu Xiu, Beijing (CN); Tsung-Chuan Ma, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 57 days.

(21) Appl. No.: 17/852,230

(22) Filed: Jun. 28, 2022

(65) Prior Publication Data

US 2022/0329817 A1    Oct. 13, 2022

Related U.S. Application Data

(63) Continuation of application No. PCT/US2020/067159, filed on Dec. 28, 2020.
(Continued)

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/117* (2014.11); *H04N 19/167* (2014.11);
(Continued)

(58) Field of Classification Search
None
See application file for complete search history.

(56) References Cited

U.S. PATENT DOCUMENTS

| 2017/0163982 A1 | 6/2017 | Fu et al. |
| 2019/0261020 A1 | 8/2019 | Galpin et al. |

(Continued)

FOREIGN PATENT DOCUMENTS

| WO | WO2020236878 A1 | 11/2020 |
| WO | WO2020259621 A1 | 12/2020 |

OTHER PUBLICATIONS

Jianle Chen, Algorithm description for Versatile Video Coding and Test Model 5 (VTM5), Joint Video Experts Team (JVET) of ITU-T SG 16 WP 3 and ISO/IEC JTC 1/SC 29/WG 11, Document: JVET-N1002-v2, 14$^{th}$ Meeting: Geneva, CH, Mar. 19-27, 2019, 79 pgs.

(Continued)

*Primary Examiner* — Stuart D Bennett
(74) *Attorney, Agent, or Firm* — MASCHOFF BRENNAN; Ran Pang; Liang Huang

(57) ABSTRACT

This application is directed to coding video data that includes a plurality of image samples of a video frame. Each image sample corresponds to one of a luma sample and a chroma sample. Each image sample is filtered using an adaptive in-loop filter having a filter length and a set of filter coefficients. A set of related image samples are identified in the filter length of each image sample. For each related image sample, a respective clip value index and a corresponding filter coefficient are identified. A difference of each related image sample and the respective image sample is clipped based on the respective clip value index that corresponds to a respective clipping boundary value equal to 2 to a power of a respective clipping number. The respective (Continued)

image sample is modified with the clipped difference of each of the related image samples based on the respective filter coefficient.

20 Claims, 14 Drawing Sheets

Related U.S. Application Data

(60) Provisional application No. 62/954,485, filed on Dec. 28, 2019.

(51) Int. Cl.
  *H04N 19/167* (2014.01)
  *H04N 19/172* (2014.01)
  *H04N 19/186* (2014.01)
  *H04N 19/85* (2014.01)

(52) U.S. Cl.
  CPC ......... *H04N 19/172* (2014.11); *H04N 19/186* (2014.11); *H04N 19/85* (2014.11)

(56) References Cited

U.S. PATENT DOCUMENTS

| | | | |
|---|---|---|---|
| 2019/0306503 A1 | 10/2019 | Dong et al. | |
| 2022/0060703 A1* | 2/2022 | Kotra | H04N 19/463 |
| 2022/0094919 A1* | 3/2022 | Lai | H04N 19/186 |
| 2022/0159249 A1* | 5/2022 | Taquet | H04N 19/82 |
| 2022/0377324 A1* | 11/2022 | Yang | H04N 19/117 |

OTHER PUBLICATIONS

Nan Hu, Non-CE5: Modification of clipping value signalling for adaptive loop filter, Joint Video Experts Team (JVET) of ITU-T SG 16 WP 3 and ISO/IEC JTC 1/SC 29/WG 11, Document: JVET-O0064-v1, $15^{th}$ Meeting: Gothenburg, SE, Jul. 3-12, 2019, 9 pgs.

Yixin Du, Non-CE5: On non-linear ALF clipping values, Joint Video Experts Team (JVET) of ITU-T SG 16 WP 3 and ISO/IEC JTC 1/SC 29/WG 11, Document: JVET-P0505-v5, $16^{th}$ Meeting: Geneva, CH, Oct. 1-11, 2019, 7 pgs.

Chen et al., "AHG16: Simplified clip ranges for NL-ALF", JVET-Q0495, Kwai Inc., Joint Video Experts Team (JVET) of ITU-T SG 16 WP 3 and ISO/IEC JTC 1/SC 29/WG 11, 17th Meeting: Brussels, BE, Jan. 7-17, 2020, 5 pgs.

Ikonin et al., "Non-CE5 Non-linear ALF simplifications", JVET-O0188-v2, Huawei Technologies, Co., Ltd, Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pgs.

Beijing Dajia Internet Information Technology Co. Ltd., International Search Report and Written Opinion, PCT/US2020/067159, dated Apr. 19, 2021, 9 pgs.

Jianle Chen et al., "Algorithm description for Versatile Video Coding and Test Model 7 (VTM 7)", Document: JVET-P2002-v1, Joint Video Experts Team (JVET) of ITU-T SG 16 WP 3 and ISO/IEC JTC 1/SC 29/WG 11, 16th Meeting: Geneva, CH, Oct. 1-11, 2019, 8 pgs.

* cited by examiner

| IBDI | Clip Value Index | | | |
|---|---|---|---|---|
| | 0 | 1 | 2 | 3 |
| 8 | 256 | 64 | 8 | 2 |
| 9 | 512 | 128 | 16 | 4 |
| 10 | 1024 | 256 | 32 | 8 |
| 11 | 2048 | 512 | 64 | 16 |
| 12 | 4096 | 1024 | 128 | 32 |
| 13 | 8192 | 2048 | 256 | 64 |
| 14 | 16384 | 4096 | 512 | 128 |
| 15 | 32768 | 8192 | 1024 | 256 |
| 16 | 65536 | 16384 | 2048 | 512 |

FIG. 9A

| IBDI | Clip Value Index | | | |
|---|---|---|---|---|
| | 0 | 1 | 2 | 3 |
| 8 | 256 | 64 | 16 | 2 |
| 9 | 512 | 128 | 32 | 4 |
| 10 | 1024 | 256 | 64 | 8 |
| 11 | 2048 | 512 | 128 | 16 |
| 12 | 4096 | 1024 | 256 | 32 |
| 13 | 8192 | 2048 | 512 | 64 |
| 14 | 16384 | 4096 | 1024 | 128 |
| 15 | 32768 | 8192 | 2048 | 256 |
| 16 | 65536 | 16384 | 4096 | 512 |

FIG. 9B

| IBDI | Clip Value Index | | | |
|---|---|---|---|---|
| | 0 | 1 | 2 | 3 |
| 8 | 256 | 32 | 8 | 2 |
| 9 | 512 | 64 | 16 | 4 |
| 10 | 1024 | 128 | 32 | 8 |
| 11 | 2048 | 256 | 64 | 16 |
| 12 | 4096 | 512 | 128 | 32 |
| 13 | 8192 | 1024 | 256 | 64 |
| 14 | 16384 | 2048 | 512 | 128 |
| 15 | 32768 | 4096 | 1024 | 256 |
| 16 | 65536 | 8192 | 2048 | 512 |

FIG. 9C

Most Significant Bit ← → Least Significant Bit

| $i^{th}$ bit | ... | $8^{th}$ bit | $7^{th}$ bit | $6^{th}$ bit | $5^{th}$ bit | $4^{th}$ bit | $3^{rd}$ bit | $2^{nd}$ bit | $1^{st}$ bit |
|---|---|---|---|---|---|---|---|---|---|
| | | | | | | | | | |

FIG. 10

IN-LOOP FILTERS FOR VIDEO CODING

CROSS-REFERENCE TO RELATED APPLICATIONS

The present application is a continuation of International Application No. PCT/US2020/067159, entitled "IN-LOOP FILTERS FOR VIDEO CODING", filed on Dec. 28, 2020, which claims priority to U.S. Provisional Application No. 62/954,485, entitled "IN-LOOP FILTERS FOR VIDEO CODING", filed on Dec. 28, 2019, both of which are incorporated by reference in their entirety.

TECHNICAL FIELD

The present application generally relates to video data coding and compression, and in particular, to method and system of improvement coding of chroma and luma components of an image frame in a bitstream of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

In-loop filtering is applied on a reconstructed video block before it is put in a reference picture store and used to code other video blocks. Adaptive Loop Filters (ALF) are applied for chroma and luma components of the reconstructed video block, respectively. It would be beneficial to have a more efficient coding mechanism to encode and decode these color components while maintaining the image quality of the decoded video data.

SUMMARY

This application describes implementations related to video data encoding and decoding and, more particularly, to method and system of improvement in coding of chroma and luma samples of a video frame by applying a bit depth based clipping operation in adaptive loop filtering. Each luma or chroma sample of the video frame is filtered based on a plurality of surrounding luma or chroma samples according to a respective adaptive loop filter (ALF) scheme. For each of luma or chroma sample, a difference of a related image sample and the respective sample is clipped into a respective dynamic range defined by a clip boundary value equal to 2 to a power of a respective clipping number.

In one aspect, a method of coding video data includes obtaining, from a bitstream, a plurality of image samples of a video frame. Each image sample corresponds to one of a luma sample and a chroma sample. The method further includes for each of the plurality of image samples, filtering the respective image sample using an adaptive in-loop filter having a filter length and a set of filter coefficients. Filtering the respective image sample further includes identifying a set of related image samples in the filter length of the respective image sample; for each of the set of related image samples, identifying a respective clip value index and a corresponding filter coefficient; clipping a difference of each of the set of related image samples and the respective image sample based on the respective clip value index; and modifying the respective image sample with the clipped difference of each of the set of related image samples based on the respective filter coefficient. For each image sample, the respective clip value index corresponds to a respective clipping boundary value equal to 2 to a power of a respective clipping number, and the respective clipping number is an integer. The method further includes reconstructing the video frame using the plurality of modified image samples.

In some embodiments, for each image sample, the difference of each of the related image samples and the respective image sample is clipped by determining an IBDI of the respective image sample; for each of the set of related image samples, determining the respective clipping boundary value based on the IBDI and the respective clip value index according to a predefined clipping boundary value formula or table, and clipping the difference of each of the set of related image samples and the respective image sample based on the respective clipping boundary value. Further, in some embodiments, the predefined clipping boundary value formula or table is stored locally in both a video encoder and a video decoder. For each image sample, the clip value indexes of the related image samples are obtained with the bitstream.

In another aspect, an electronic device includes one or more processors and memory for storing instructions, which when executed by the one or more processors cause the electronic device to perform the methods of coding video data as described above.

In yet another aspect, a non-transitory computer readable storage medium stores has instructions stored thereon, which when executed by one or more processors of an electronic device cause the one or more processors to perform the methods of coding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIGS. 9A-9C are three example predefined clipping boundary value tables in accordance with some embodiments.

FIG. 10 is a data structure of a value to be clipped for an image sample, in accordance with some embodiments.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
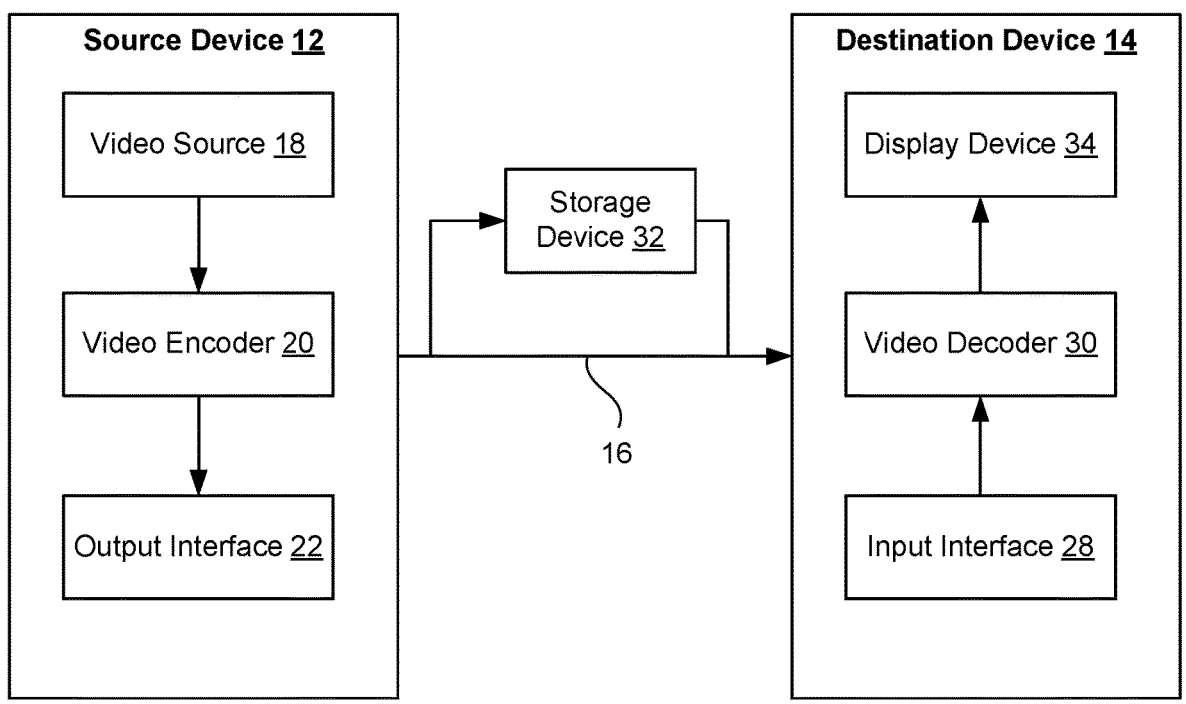
FIG. 1 is a block diagram illustrating an exemplary video encoding and decoding system, in accordance with some embodiments.

FIG. 1 is a block diagram illustrating an exemplary system 10 for encoding and decoding video blocks in parallel, in accordance with some embodiments. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
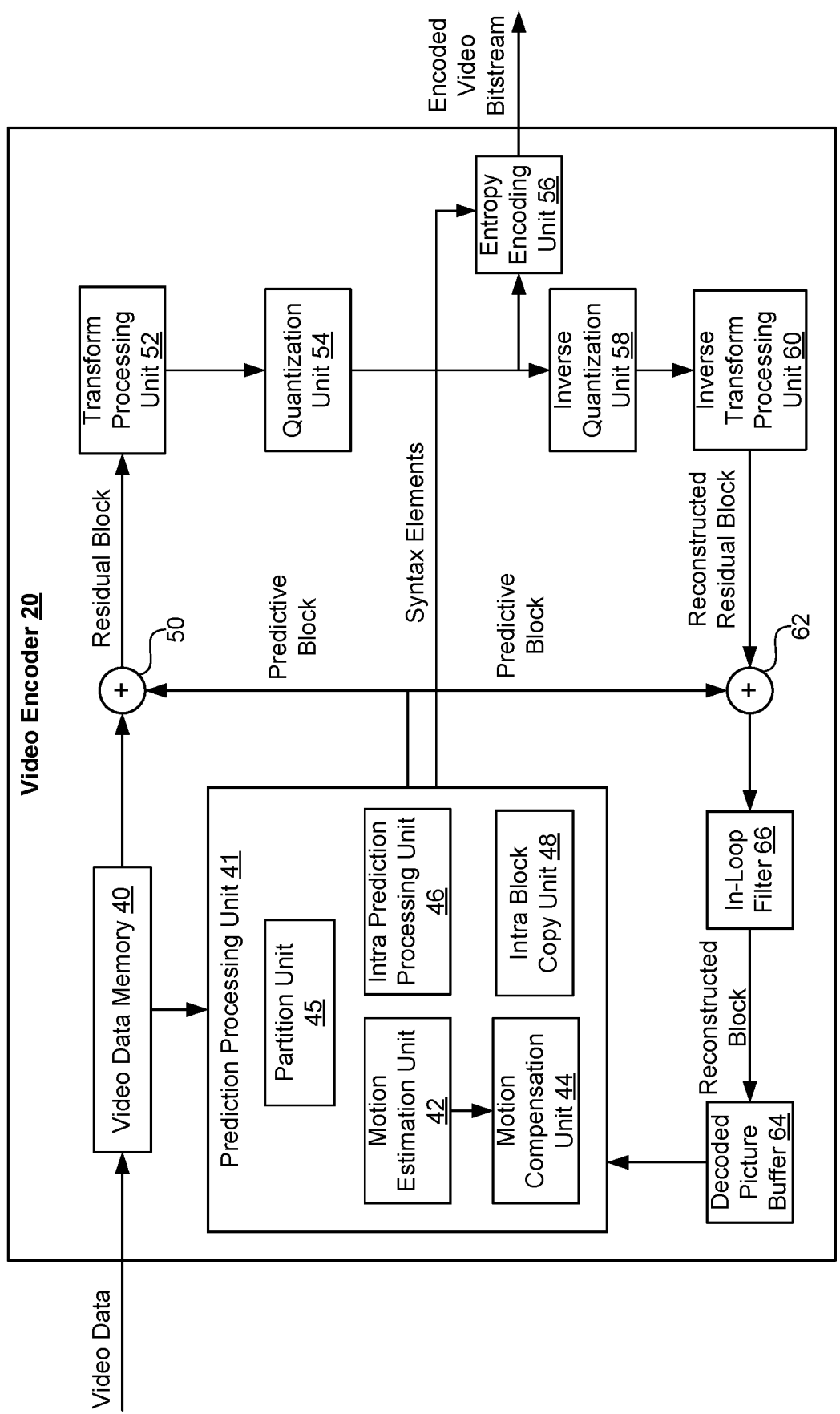
FIG. 2 is a block diagram illustrating an exemplary video encoder, in accordance with some embodiments.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. An in-loop filter 66 may be positioned between summer 62 and DPB 64, and includes a deblocking filter to filter block boundaries and remove blockiness artifacts from reconstructed video. The in-loop filter 66 further includes a sample adaptive offset (SAO) and adaptive in-loop filter (ALF) to filter the output of summer 62 before the output of summer 62 is put into DPB 64 and used to code other video blocks. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
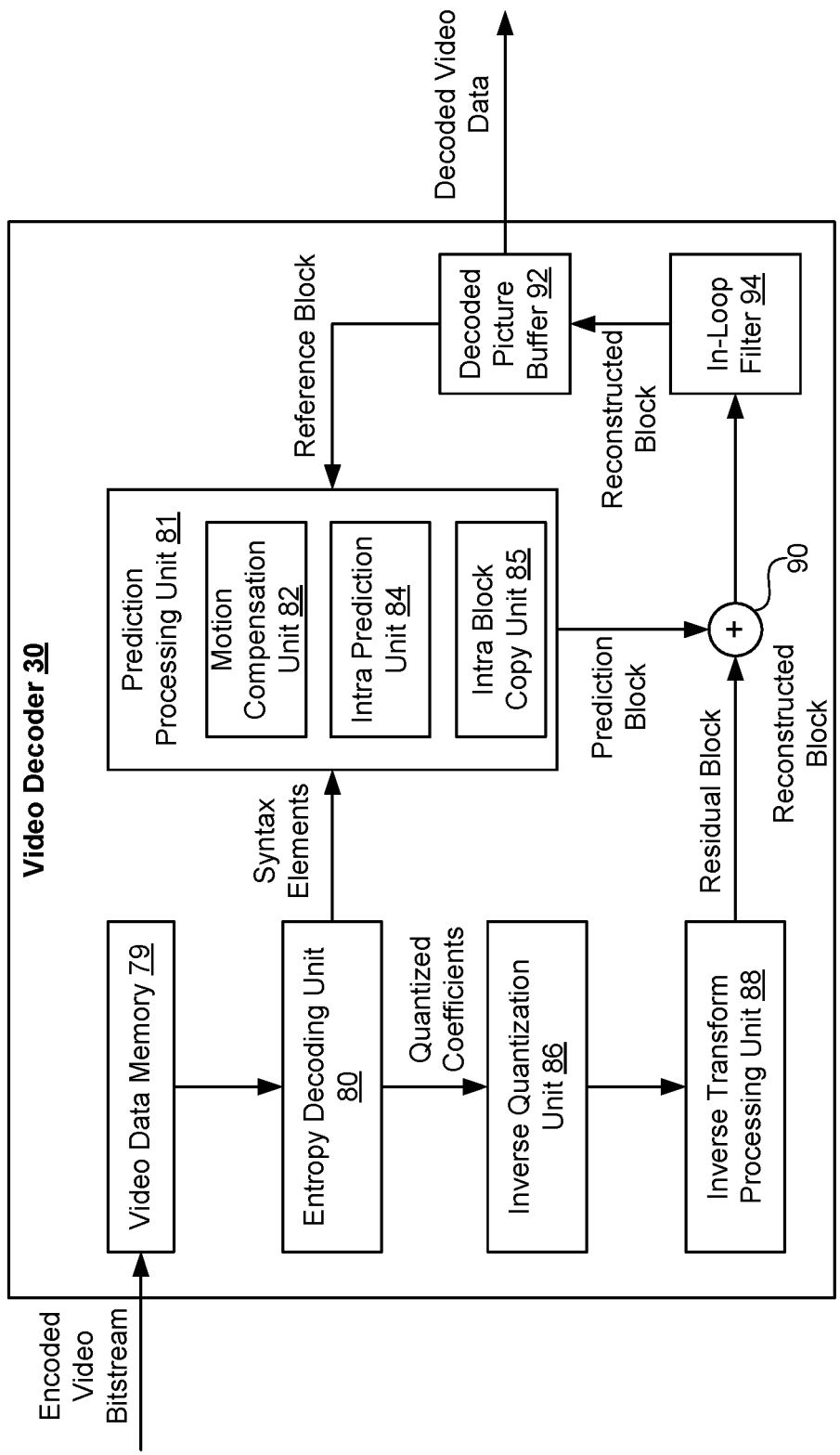
FIG. 3 is a block diagram illustrating an exemplary video decoder, in accordance with some embodiments.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements.

Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter 94 may be positioned between summer 90 and DPB 92, and includes a deblocking filter to filter block boundaries and remove blockiness artifacts from the decoded video block. The in-loop filter 94 further includes a SAO filter and an ALF to filter the decoded video block outputted by summer 90. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
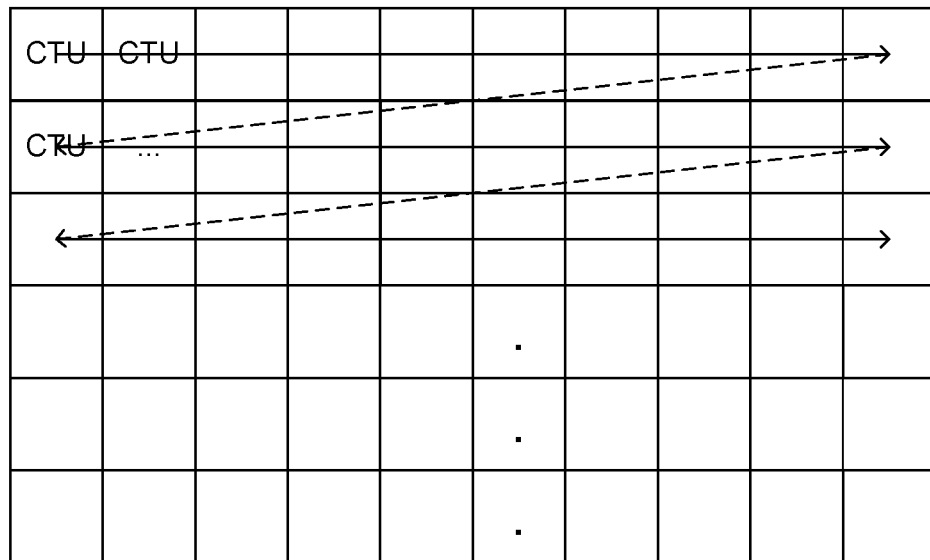
FIGS. 4A-4E are schematic diagrams to recursively partition an image frame into video blocks of different sizes and shapes, in accordance with some embodiments.
Figure 4B:
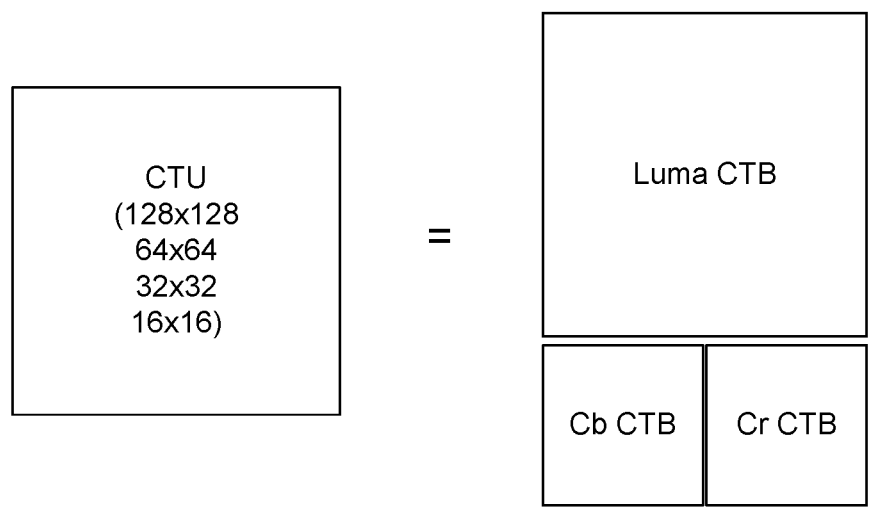

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs).

Figure 4C:
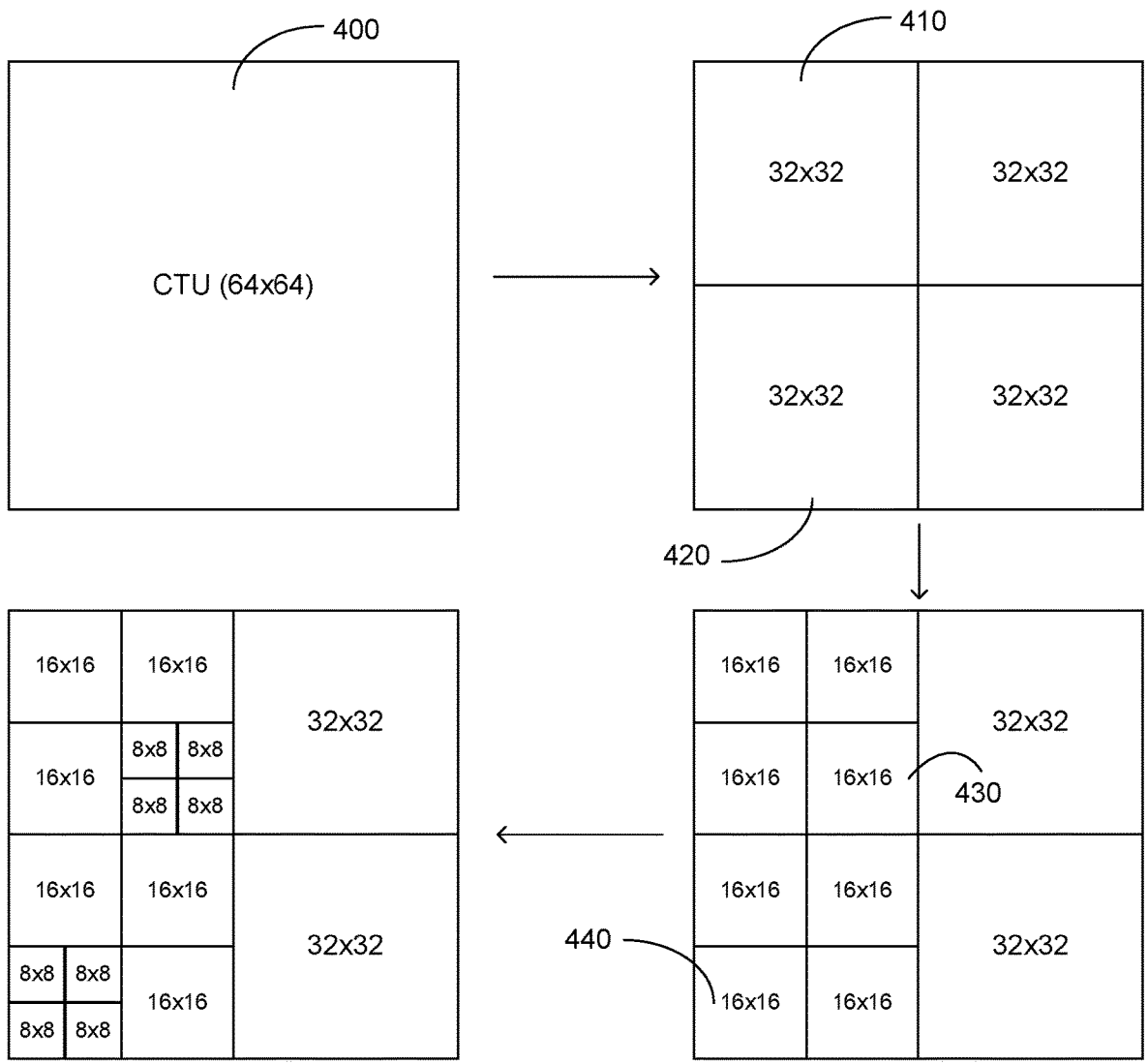
Figure 4D:
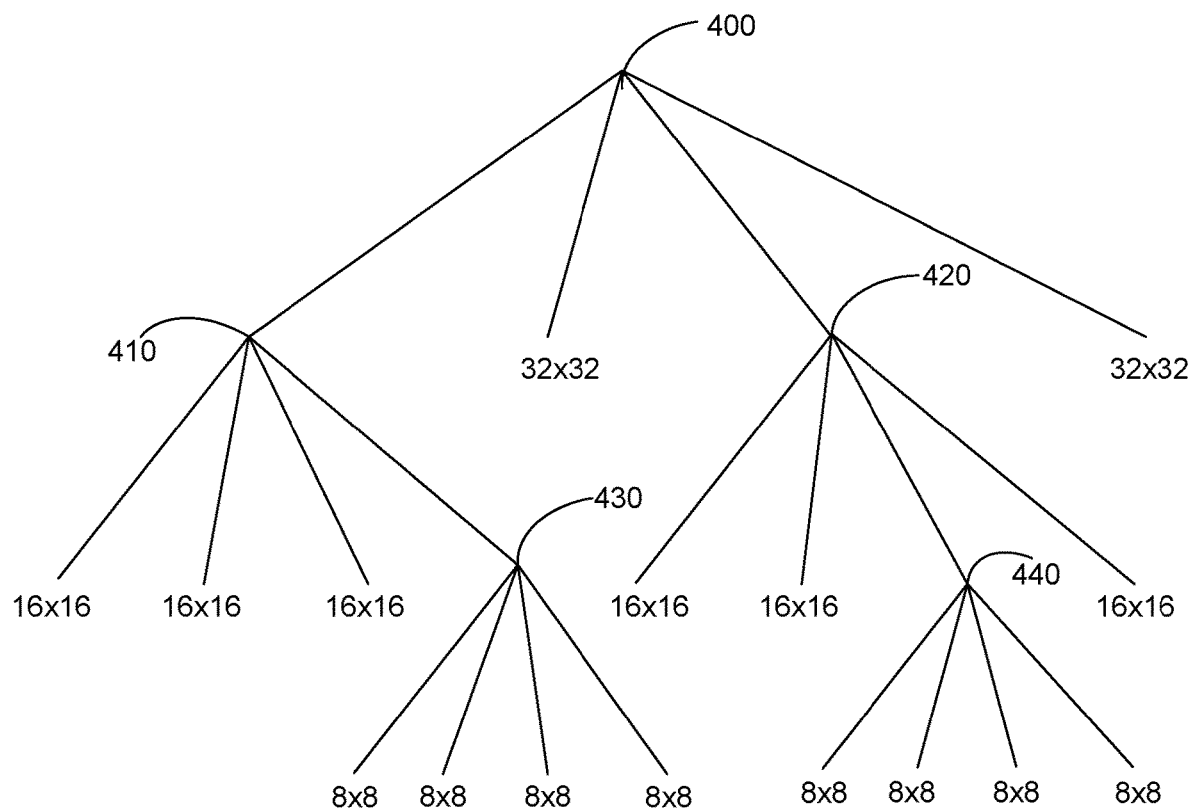
Figure 4E:
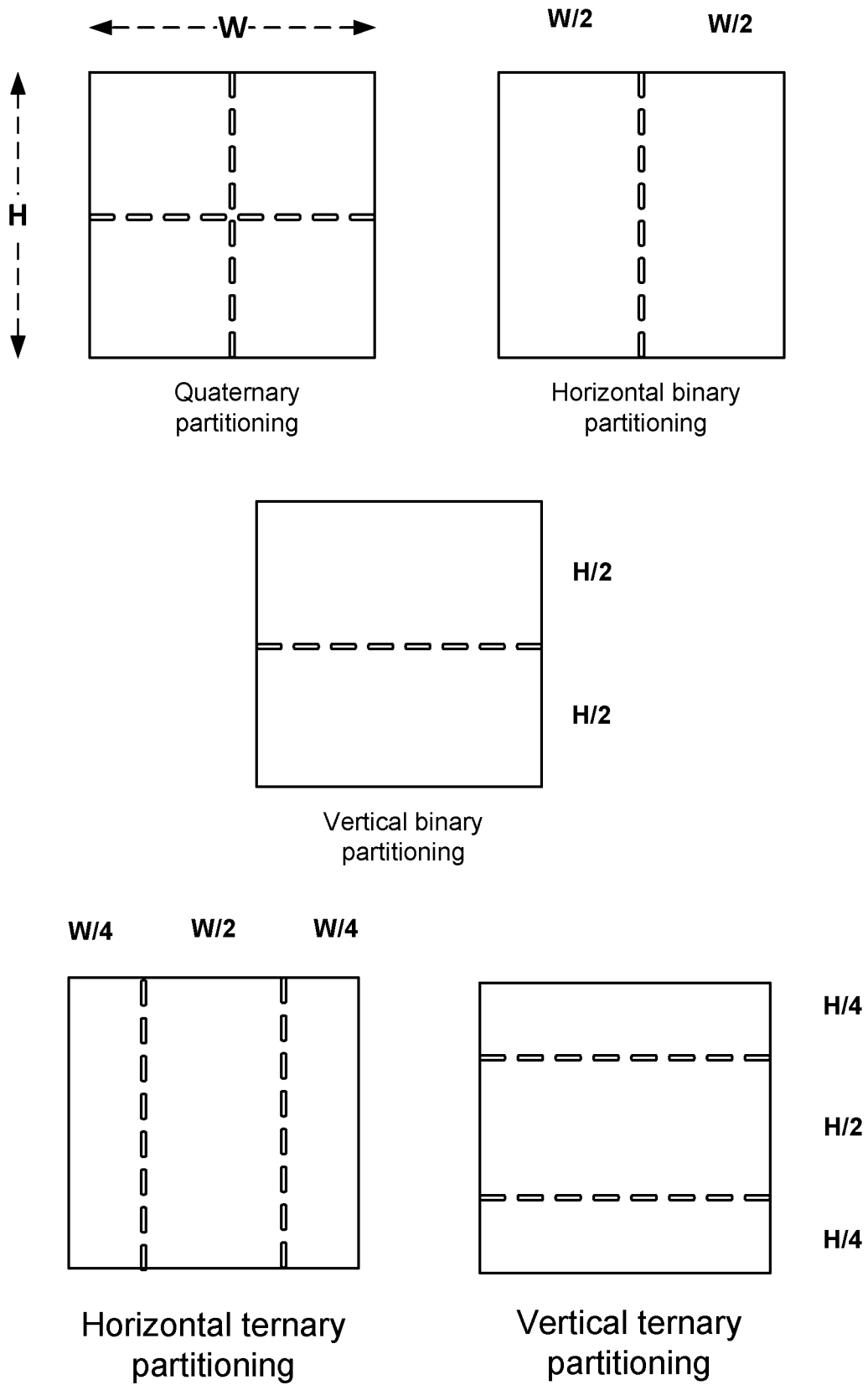

As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indexes for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5:
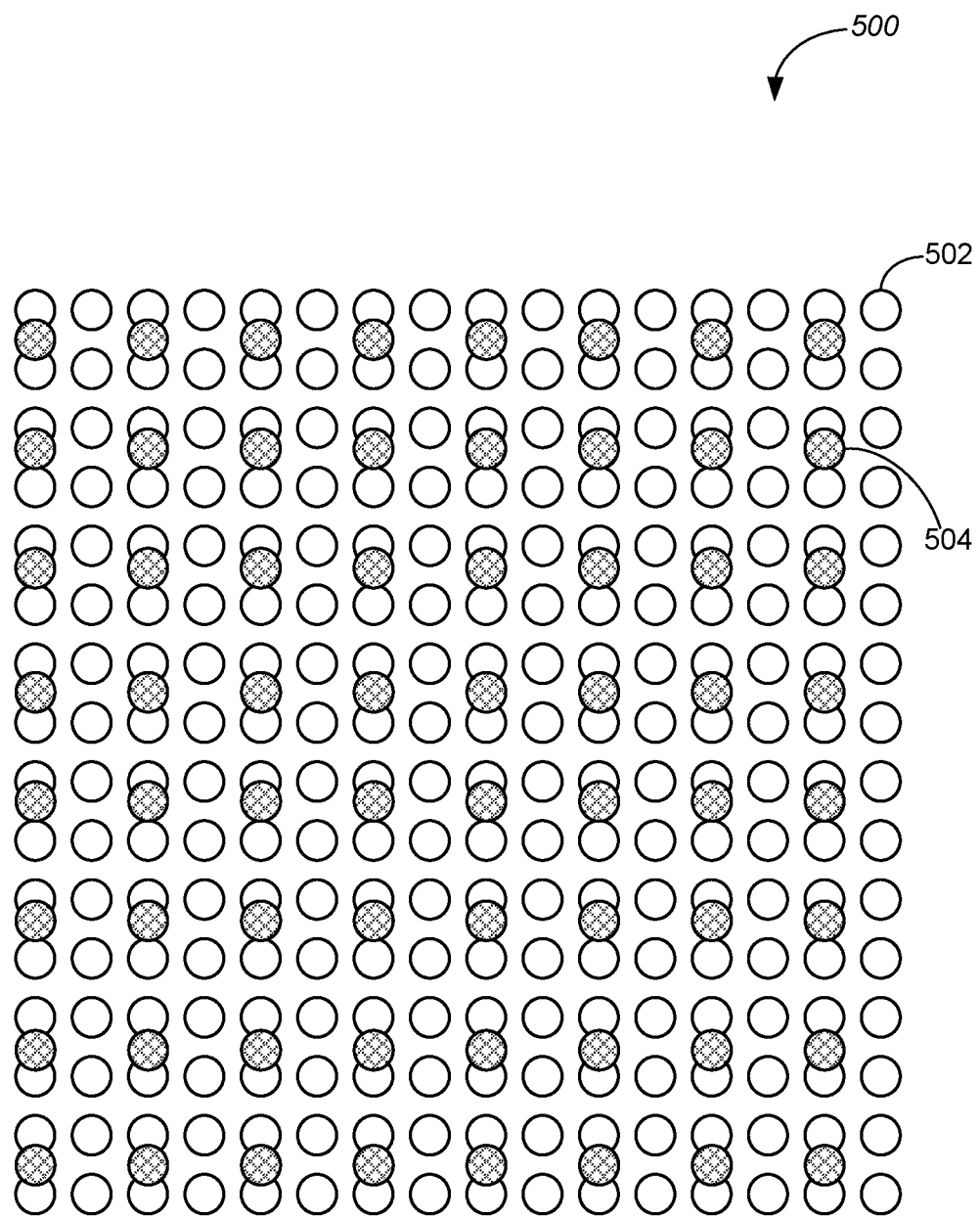
FIG. 5 illustrates a portion of a video frame in a bitstream, in accordance with some embodiments.

FIG. 5 illustrates a portion of a video frame 500 in a bitstream, in accordance with some embodiments. The video frame 500 includes a plurality of pixels, and each pixel is made of a plurality of color elements (e.g., blue, green and red). In video encoding and decoding, color information of the plurality of pixels is represented by a plurality of luma samples 502 and a plurality of chroma samples 504. Each of the plurality of pixels corresponds to a respective luma sample 502, and each luma sample 502 also corresponds to a respective pixel in the video frame 500. Each chroma sample 504 corresponds to a respective set of luma samples 502 according to a subsampling scheme. Each luma sample 502 has a luma component Y', and each chroma sample 504 has a blue-difference chroma component Cb and a red-difference chroma component Cr. The subsampling scheme of the luma and chroma components (Y':Cb:Cr) has a three-part ratio, e.g., 4:1:1, 4:2:0, 4:2:2, 4:4:4, and 4:4:0. Specifically, the luma samples 502 and chroma samples 504 of the video frame 500 comply with the subsampling scheme having the three-part ratio equal to 4:1:1, and on average, every four luma samples 502 correspond to one chroma sample 504 having the blue-difference chroma component Cb and the red-difference chroma component Cr.

Figure 6:
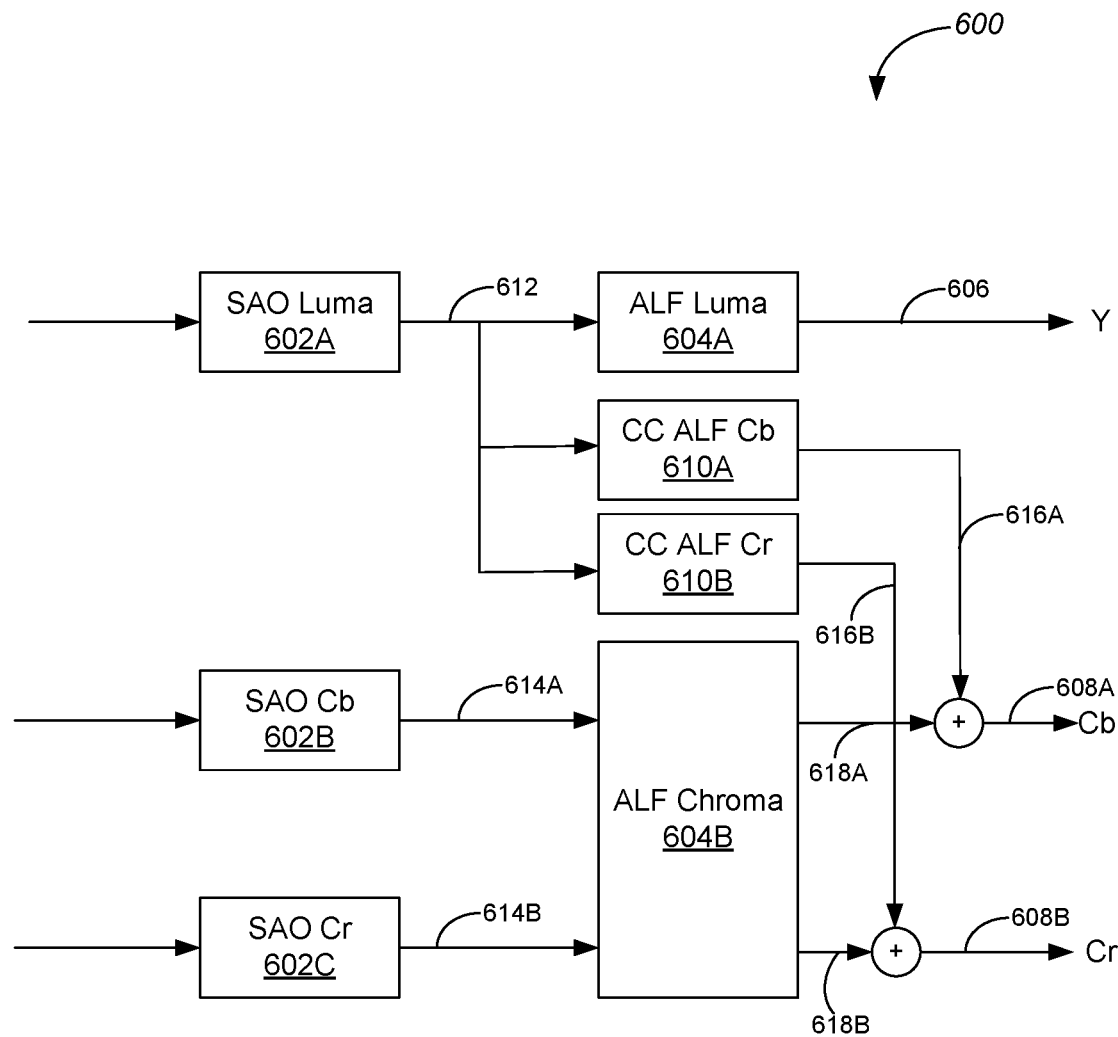
FIG. 6 is a block diagram of an in-loop filter that is applied in a video encoder or decoder, in accordance with some embodiments.

FIG. 6 is a block diagram of an in-loop filter 600 that is applied in a video encoder 20 or decoder 30, in accordance with some embodiments. In video encoding or encoding, each of the luma samples 502 and chroma samples 504 is reconstructed from residual blocks of the video frame 500 and filtered by a deblocking filter, one or more sample adaptive offset (SAO) filters 602, and one or more adaptive loop filters (ALF) filters 604 of the in-loop filter 600 (e.g., the in-hoop filters 66 and 94 in FIGS. 2 and 3) to remove artifacts. The filtered luma samples 606 and chroma samples 608 are stored into a decoded picture buffer 64 or 92 and used to code or decode other video blocks in the video frame 500. In some embodiments, each of the deblocking, SAO 602 and ALF filters 604 is configured to filter the luma samples 502 or chroma samples 504 based on the same type of samples, e.g., filter each luma sample 502 based on a respective set of adjacent luma samples 502 and filter each luma sample 502 based on a respective set of adjacent chroma samples 504. In some embodiments, the in-loop filter 600 further includes a cross component filter 610 configured to filter each chroma sample 504 based on one or more luma samples 502 that are adjacent to the respective chroma sample 504. Conversely, in some embodiments, the in-loop filter 600 includes an alternative cross component filter configured to filter each luma sample 502 based on one or more chroma samples 504 that are adjacent to the respective luma sample 502.

Specifically, the video encoder 20 or decoder 30 obtains a plurality of luma samples 502 and a plurality of chroma samples 504 of a video frame 500. Each luma sample 502 has a respective luminance value, and each chroma sample 504 has a respective luminance value. The SAO filter 602 compensates each of the plurality of luma samples 502 and the plurality of chroma samples 504. Specifically, the SAO filters 602A, 602B and 602C compensate the luma samples 502, blue blue-difference chroma components Cb of the chroma samples 504, and red-difference chroma components Cr of the chroma samples 504, respectively. The ALFs 604 are coupled to the SAO filters 602. Each of the compensated luma samples 612 is updated to a luma sample 606 using a luma ALF 604A based on a set of adjacent compensated luma samples 612, while each of the compensated chroma samples 614A and 614B is updated to a chroma sample 608A or 608B using a chroma ALF 604B based on a set of adjacent compensated chroma samples 614.

In some embodiments, the cross component filter 610 is configured to generate a chroma refinement value 616 for each chroma sample 504 based on a set of luma samples 502. The respective chroma sample 504 is updated using the chroma refinement value 616, i.e., a chrominance value of the respective chroma sample 504 is refined with the chroma refinement value 616. The updated respective chroma sample 608 is stored in association with the video frame 500. In some embodiments, the cross component filter 610 includes a first cross component filter 610A and a second cross component filter 610 configured to generate a first refinement value 616A and a second refinement value 616B. The blue-difference and red-difference chroma components 618A and 618B are separately updated using the first and second refinement values 616A and 616B to output a first refined chrominance value 608A and a second refined chrominance value 608B, respectively.

Each of the deblocking, SAO, and ALF filters of the in-loop filter 600 includes one or more in-loop filter coefficients, and the cross component ALF 610 also includes a plurality of cross component filter coefficients. The in-loop and cross component filter coefficients are signaled in an Adaptation Parameter Set (APS). In an example, an APS carries and signals multiple sets (e.g., up to 25 sets) of luma filter coefficients and clipping value indexes, and multiple sets (e.g., up to 8 sets) of chroma filter coefficients and clipping value indexes. The APS is transferred with the video frame 500 in the bitstream from the video encoder 20 to the video encoder 30, i.e., the APS is an overhead of the transfer of the bitstream. In some embodiments, filter coefficients of different classification for luma components of the luma samples 502 are merged to reduce the overhead of the transfer of the bitstream. In an example, the indexes of the APS used for an image slice are signaled in a corresponding slice header.

Figure 7A:
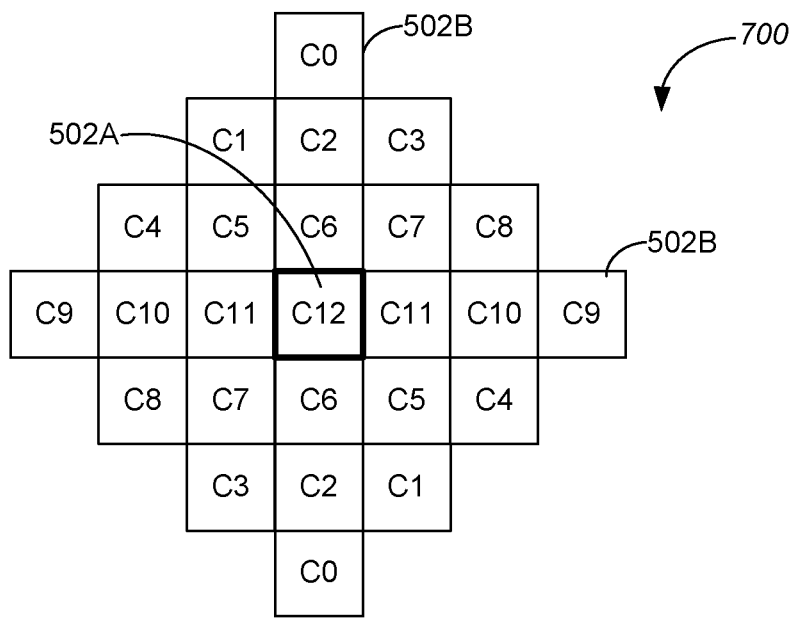
FIG. 7A is an example ALF filtering scheme in which a luma sample is processed based on a set of related luma samples by a luma ALF, in accordance with some embodiments.
Figure 7B:
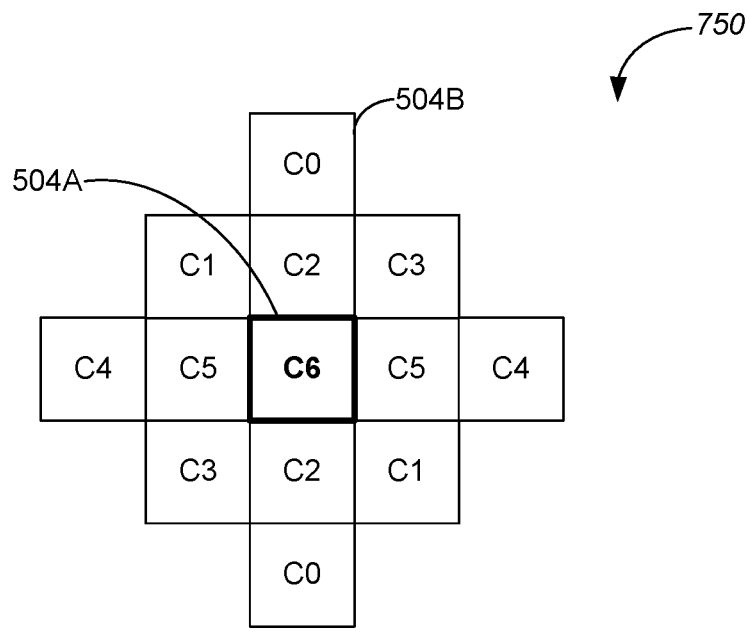
FIG. 7B is an example ALF filtering scheme in which a chroma sample is processed based on a set of related chroma samples by a chroma ALF, in accordance with some embodiments.

FIG. 7A is an example ALF filtering scheme 700 in which a luma sample 502A is processed based on a set of related luma samples 502B by a luma ALF 604A, in accordance with some embodiments, and FIG. 7B is an example ALF filtering scheme 750 in which a chroma sample 504A is processed based on a set of related chroma samples 504B by a chroma ALF 604B, in accordance with some embodiments. The luma ALF 604A has a diamond filter shape (e.g., a 7×7 diamond shape) and is selected from a plurality of predefined filters (e.g., 25 filters having predefined filter coefficients) for each 4×4 block based on a direction and activity of local gradients. Each square in FIG. 7A represents a luma sample 502 labelled with a corresponding filter coefficient (C0-C12) of the luma ALF 604A having the diamond shape. For the luma sample 502A, a total 13 filter coefficients (C0-C12) are symmetrically applied to combine 25 luma samples 502 using the luma ALF 604A. Similarly, the chroma ALF 604B has a diamond filter shape (e.g., a 5×5 diamond shape) and is selected from a plurality of predefined filters (e.g., 8 filters having predefined filter coefficients). Each square in FIG. 7B represents a chroma sample 504 labelled with a corresponding filter coefficient (C0-C6) of the chroma ALF 604B having the diamond shape. For the chroma sample 504A, a total 7 filter coefficients (C0-C6) are symmetrically applied to combine 13 chroma samples 504 in the chroma ALF 604B.

When adaptive loop filtering is enabled, e.g., for a CTB, each image sample R(i, j) (e.g., luma sample 502A, chroma sample 504A) within the CU is filtered, resulting in sample value R'(i, j) as follows:

$$R'(i,j)=R(i,j)+((\Sigma_{k\neq0}\Sigma_{l\neq0}f(k,l)\times K(R(i+k,j+l)-R(i,j),c(k,l))+64)>>7) \qquad (1)$$

where $f(k, l)$ denotes the decoded filter coefficients, $K(x, y)$ is the clipping function and $c(k, l)$ denotes the decoded clipping parameters. The variable k and l vary between $$-\frac{L}{2} \text{ and } \frac{L}{2}$$

where L denotes the filter length.

For clipping in adaptive loop filtering, each image sample involves a set of related image samples in a filter length L of an ALF 604. Referring to FIG. 7A, related luma samples 502B of each luma sample 502A include 3 rows of luma samples (i.e., 9 luma samples) above the respective luma sample 502A, 3 rows of luma samples (i.e., 9 luma samples) below the respective luma sample 502A, 3 luma samples to the left of the respective luma sample 502A, and 3 luma samples to the right of the respective luma sample 502A. Referring to FIG. 7B, related chroma samples 504B of each chroma sample 504A include 2 rows of chroma samples (i.e., 4 chroma samples) above the respective chroma sample 504A, 2 rows of chroma samples (i.e., 4 chroma samples) below the respective chroma sample 50rA, 2 chroma samples to the left of the respective chroma sample 504A, and 2 chroma samples to the right of the respective chroma sample 504A.

In some embodiments, ALF filter parameters are signaled in an APS including clipping value indexes representing the aforementioned clipping parameters c(k, l). In one APS, up to 25 sets of luma filter coefficients (e.g., a set of C0-C12 in FIG. 7A) and clipping value indexes, and up to 8 sets of chroma filter coefficients (e.g., a set of C0-C6 in FIG. 7B) and clipping value indexes could be signaled. To reduce signaling bits overhead, filter coefficients of different classification for luma samples 502A can be merged. In slice header, indexes of the APSs used for the current slice are signaled. Clipping value indexes, which are decoded from the APS, allow determining clipping boundary values using a predefined clipping boundary value formula or table. These boundary clipping values are dependent on the internal bit depth, and defines a dynamic range to which differences of a set of related image samples and an image sample 502A or 504A are clipped. In some embodiments, different predefined clipping boundary value formulas or tables are applied to luma samples 502A and chroma samples 504A.

In some embodiments, in a slice header, a plurality of APS indexes (e.g., 7 indexes) can be signaled to select a subset of a plurality of corresponding luma and chroma filter sets for adaptive loop filtering in a current slice. This adaptive loop filtering process can be controlled at a CTB level. A flag is signaled to indicate whether adaptive loop filtering is applied to a luma CTB. In accordance with a determination that the flag enables adaptive loop filtering, a luma CTB chooses a luma filter set among a plurality of (e.g., 16) luma filter sets. A luma filter set index is signaled for the luma CTB to indicate which luma filter set is applied. Each of the plurality of filter sets is pre-defined and hard-coded in both the encoder 20 and the decoder 30, and only a luma filter set index needs to be transmitted with a bitstream carrying the video frame 500. Likewise, for chroma samples 504A, when the flag enables adaptive loop filtering, a chroma filter set index is signaled in a slice header to select one of a plurality of chroma filter sets for adaptive loop filtering of the current slice. At the CTB level, the chroma filter set index is signaled for each chroma CTB if there is more than one chroma filter set in the APS. Each of the filter sets is stored locally in a video encoder or decoder with filter coefficients $f(k, l)$ and clipping parameters $c(k, l)$ or with indexes of the filter coefficients $f(k, l)$ and clipping parameters $c(k, l)$.

In some embodiments, the filter coefficients are quantized with a norm equal to 128. A bitstream conformance is applied such that values of the filter coefficients having a non-central position shall be in the range of $[-2^7$ to $2^7-1]$. A filter coefficient having a central position is not signaled in the bitstream and is presumed to 128.

Figure 8:
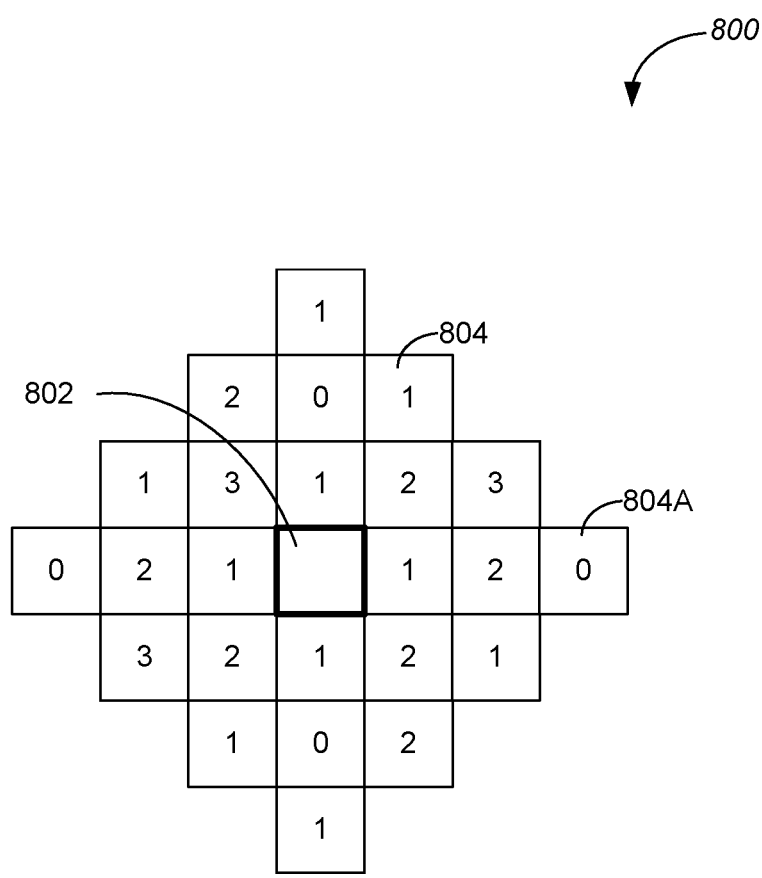
FIG. 8 is an example ALF filtering scheme having a clip value index for a set of related image samples of each image sample in a block of an image frame, in accordance with some embodiments.

FIG. 8 is an example ALF filtering scheme 800 having a clip value index for a set of related image samples 804 of each image sample 802 in a block of an image frame, in accordance with some embodiments. For each image sample 802 (e.g., luma sample 502A, chroma sample 504A), an ALF 604 has a filter length L and corresponds to a plurality of filter coefficients (e.g., C0-C13 for luma sample 502A). A set of related image samples 804 are identified in the filter length of the respective image sample 802. A respective clip value index and a corresponding filter coefficient are identified for each of the set of related image samples 804 (e.g., luma samples 502B corresponding to filter coefficients C1-C12 in FIG. 7). For example, each related image sample 804 in FIG. 8 has a clip value index equal to 0, 1, 2 or 3.

The respective clip value index corresponds to a respective clipping boundary value M equal to 2 to a power of a respective clipping number i, and the respective clipping number i is an integer. The ALF 604 clips a difference of each of the set of related image samples 804 and the respective image sample 802 into a dynamic range DR defined by the respective clipping boundary value M associated with the respective clip value index. The respective image sample 802 (e.g., luma sample 502A, chroma sample 504A) is modified with the clipped difference of each of the set of related image samples 804 based on the respective filter coefficient, such that the image frame can be reconstructed using the plurality of modified image samples 802. When boundary values are limited to 2 to powers of integer numbers, clipping differences of related image samples 804 and each image sample 802 includes only logical AND operations and/or logic OR operations. By these means, this clipping operation does not include any comparison operations on each image sample 802, thereby reducing amount of computation needed for adaptive loop filtering and saving computation resources from coding the corresponding video frame.

In some embodiments, for a first block of image samples, a single set of clip value indexes are determined for all image samples 802 in the first block. The set of value indexes is transferred from a video encoder 20 to a video decoder 30 with the block of image samples, allowing the ALF 604 to process each of the image samples 802 in the first block based on the same single set of clip value indexes. An example block is the entire video frame, a slice, a brick, a tile, a tile group, a coding tree or any of other coding units. Further, in some embodiments, the video frame includes a second block that is distinct from the first block. A second set of clip value indexes are used for adaptive loop filtering of the image samples 802 in the second block. The second set of clip value indexes are determined separately from the single set of clip value indexes used for the first block of images.

FIGS. 9A-9C are three example predefined clipping boundary value tables 900A-900C in accordance with some embodiments. Each of the predefined clipping boundary value tables 900 associates a set of clip value indexes 902 with a set of clipping boundary values (M) 904 according to a set of internal bit depth indexes (IBDI) 906. Each and every one of the clipping boundary values Min these tables 900A-900C is equal to 2 to a power of a respective clipping number i. Each clipping boundary value table 900 is applied in the ALF 604 as a reference to determine a clipping boundary value M for a respective clip value index. For example, for a first image sample 802 of a video frame, when a difference of one of its related image samples 804A and the first image sample 802 is clipped, a respective clip value index 902A (i.e., equal to 0) is provided with this related image sample 804A, and the IBDI 906A (e.g., IBDI=10) can be determined from the first image sample 802 to be filtered. The respective clipping boundary value 904A (i.e., equal to 1024) is identified from the predefined clipping boundary value table 900A at a cross section of a column corresponding to the clip value index 902A and a row corresponding to the IBDI 906A.

Each clipping boundary value 904 is equal to 2 to a power of a respective clipping number i. For the same clip value index (e.g., 902A), the respective clipping number i is an integer that increases with the IBDI 906 in a linear manner. Each boundary value 904 (M) is represented as a function of the respective clipping number i as follows:

$$M=2^i. \qquad (1)$$

In some embodiments, for each related image sample 804 used for adaptive loop filtering of a first image sample 802, the clipped difference of the related image sample 804 and first image sample 802 is in a range of $[-M, M-1]$, i.e., $[-2^i, 2^i-1]$. Alternatively, in some embodiments, the clipped difference of the related image sample 804 and first image sample 802 is in a range of $[-M+1, M]$, i.e., $[-2^i+1, 2^i]$. Alternatively, in some embodiments, the clipped difference of the related image sample 804 and first image sample 802 is in a range of $[-M+1, M-1]$, i.e., $[-2^i+1, 2^i-1]$. Alternatively, in some embodiments, the clipped difference of the related image sample 804 and first image sample 802 is in a range of $[-M, M]$, i.e., $[-2^i, 2^i]$.

In some embodiments, a predefined clipping boundary value table 900 used in filtering of a block of image samples 802 is obtained with the bitstream carrying the block, allowing the table 900 to be updated for each block of image samples 802. An example block is the entire video frame, a slice, a brick, a tile, a tile group, a coding tree or any of other coding units. Alternatively, two copies of the same predefined clipping boundary value table 900 used in adaptive loop filtering are stored separately in a video encoder 20 and a video decoder 30. During the course of filtering the block of image samples 802, the predefined clipping boundary value table 900 is not received with the video frame, but extracted from a local memory that pre-stores one or more distinct predefined clipping boundary value tables (e.g., a subset or all of the tables 900A-900C). Image samples 802 of a block share a set of clip value indexes and a boundary table indicator. The set of clip value indexes and the boundary table indicator are obtained in conjunction with the block of image samples 802 in the bitstream, while the one or more clipping boundary value tables are stored locally. One of the clipping boundary value tables 900 is selected based on the boundary table indicator and applied in the clipping operation to filter each image sample 802 in the block.

The predefined clipping boundary value table 900A is represented by the following formula:

$$CBV = \begin{cases} 2^{IBDI}, & CVI = 0 \\ 2^{IBDI-2}, & CVI = 1 \\ 2^{IBDI-5}, & CVI = 2 \\ 2^{IBDI-7}, & CVI = 3 \end{cases} \quad (2)$$

where CVI is the respective clip value index, and CBV is the respective clipping boundary value for each of the set of related image samples 804. In some embodiments, the clipping boundary value table 900A is not stored in the local memory, and formula (2) is stored therein. For each image sample 802, a clipping boundary value is determined for each related image sample 804 based on the IBDI and the respective clip value index according to the above predefined clipping boundary value formula (2).

Clipping boundary values for a clip value index of 2 are different in the predefined clipping boundary value tables 900A and 900B. The predefined clipping boundary value table 900B is represented by the following formula:

$$CBV = \begin{cases} 2^{IBDI}, & CVI = 0 \\ 2^{IBDI-2}, & CVI = 1 \\ 2^{IBDI-4}, & CVI = 2 \\ 2^{IBDI-7}, & CVI = 3 \end{cases} \quad (3)$$

In some embodiments, the clipping boundary value table 900B is not stored in the local memory, and formula (3) is stored therein. For each image sample 802, a clipping boundary value is determined for each related image sample 804 based on the IBDI and the respective clip value index according to the above predefined clipping boundary value formula (3).

Clipping boundary values for a clip value index of 1 are different in the predefined clipping boundary value tables 900A and 900C. The predefined clipping boundary value table 900C is represented by the following formula:

$$CBV = \begin{cases} 2^{IBDI}, & CVI = 0 \\ 2^{IBDI-3}, & CVI = 1 \\ 2^{IBDI-5}, & CVI = 2 \\ 2^{IBDI-7}, & CVI = 3 \end{cases} \quad (4)$$

In some embodiments, the clipping boundary value table 900C is not stored in the local memory, and formula (4) is stored therein. For each image sample 802, a clipping boundary value is determined for each related image sample 804 based on the IBDI and the respective clip value index according to the above predefined clipping boundary value formula (4).

In some embodiments, a bitstream includes a plurality of image samples 802 of a video frame. The plurality of image samples 802 includes a subset of luma samples 502A and a subset of chroma samples 504A. The subset of luma samples 502A corresponds to a first set of clip value indexes defining a respective clip value index of each of a set of related luma samples 502B in a first filter length $L_1$ of each luma sample 502A. The subset of chroma samples 504A corresponds to a second set of clip value indexes defining a respective clip value index of each of a set of related chroma samples 504B in a second filter length $L_2$ of each chroma sample 504A. The second set of clip value indexes are distinct from the first set of clip value indexes. Further, in some embodiments, each set of the first and second sets of clip value indexes corresponds to a clipping boundary value table or formula that associates each clip value index in the respective set of clip value indexes with the respective clipping boundary value based on an IBDI. Additionally, in some embodiments, the clipping boundary value table or formula is selected from a predefined number of clipping boundary value tables or formulas. Alternatively, in some embodiments, the first and second sets of clip value indexes correspond to a first clipping boundary value table/formula and a second value table/formula distinct from the first clipping boundary value table/formula.

FIG. 10 is a data structure of a value 1000 to be clipped for an image sample 802, in accordance with some embodiments. The image sample 802 corresponds to one of a luma sample 502 and a chroma sample 504 of a video frame. In some embodiments, the value 1000 to be clipped corresponds to a difference of a related image sample 804 and the image sample 802. The first bit of the binary representation of the value 1000 is defined as the least significant bit (LSB) which is usually the rightmost bit. An index of a bit increases by 1 starting from the LSB toward the most significant bit (MSB) that is the leftmost bit. In some embodiments, a dynamic range for a clipping a difference of a related image sample 804 and a respective image sample 802 is defined a clipping upper-bound value −M and a lower-bound value M−1, and represented in a form of [−M, M−1], where M is equal to 2'. A corresponding clipping operation can be implemented as logical "AND" and/or logical "OR" operations performed on bits ranging from the $(i+1)^{th}$ bit to the MSB. Using the operations of logical "AND" and/or logical "OR" is simpler than performing comparison-based clipping operations.

In an example, assuming that the value 1000 to be clipped is represented by 11 bits with a value range from $-2^{11}$ to $2^{11}-1$ inclusive. The clipping upper-bound and lower-bound values define a dynamic range of $[-2^4, 2^4-1]$, and bits ranging from the fifth bit to the MSB need to be checked to determine whether this value 1000 exceeds the dynamic range defined by the upper-bound and lower-bound values.

If the value 1000 to be clipped is positive, a logical "OR" operation is performed on all those bits ranging from the fifth bit to the MSB. If the result of the logical "OR" operation is 1, then the value 1000 is larger than $2^4-1$ and this value 1000 is clipped into $2^4-1$. If the value 1000 to be clipped is negative, a logical "AND" operation is performed on all those bits ranging from the fifth bit to the MSB. If the results of the logical "AND" operation is 0, then the value 1000 is smaller than $-2^4$ and this value 1000 is clipped into $-2^4$.

In another example, the value 1000 to be clipped is in a value range from −16 to 15. The value 1000 has five bits. A single bit is used to represent the sign and four bits are used to represent a magnitude of the value 1000. The clip boundary value is 4, and the dynamic range for clipping is set as $[-2^2, 2^2-1]$. If the input value 1000 is equal to 14 (which is binarized as 0,1110), a logical "OR" operation is applied to the third and fourth bins and results in a value of 1, indicating that the input value 1000 exceeds the upper bound and therefore is clipped to the upper bound value of 3. If the input value 1000 is equal to 2 (b which is binarized as 0,0010), a logical "OR" operation is applied to the third and fourth bins and results in a value of 0, indicating that the input value 1000 does not exceed the upper bound and is kept unchanged. If the input value 1000 is equal to −14 (which is binarized as 1,0010), a logical "AND" operation is applied to the third and fourth bins and results in a value of 0, indicating that the input value 1000 exceeds the lower bound and is set to the lower bound value of −4. If the input value 1000 is equal to −2 (which is binarized as 1,1110), a logical "AND" operation is applied to the third and fourth bins and results in a value of 1, indicating that the input value 1000 does not exceed the lower bound and is kept unchanged.

Figure 11:
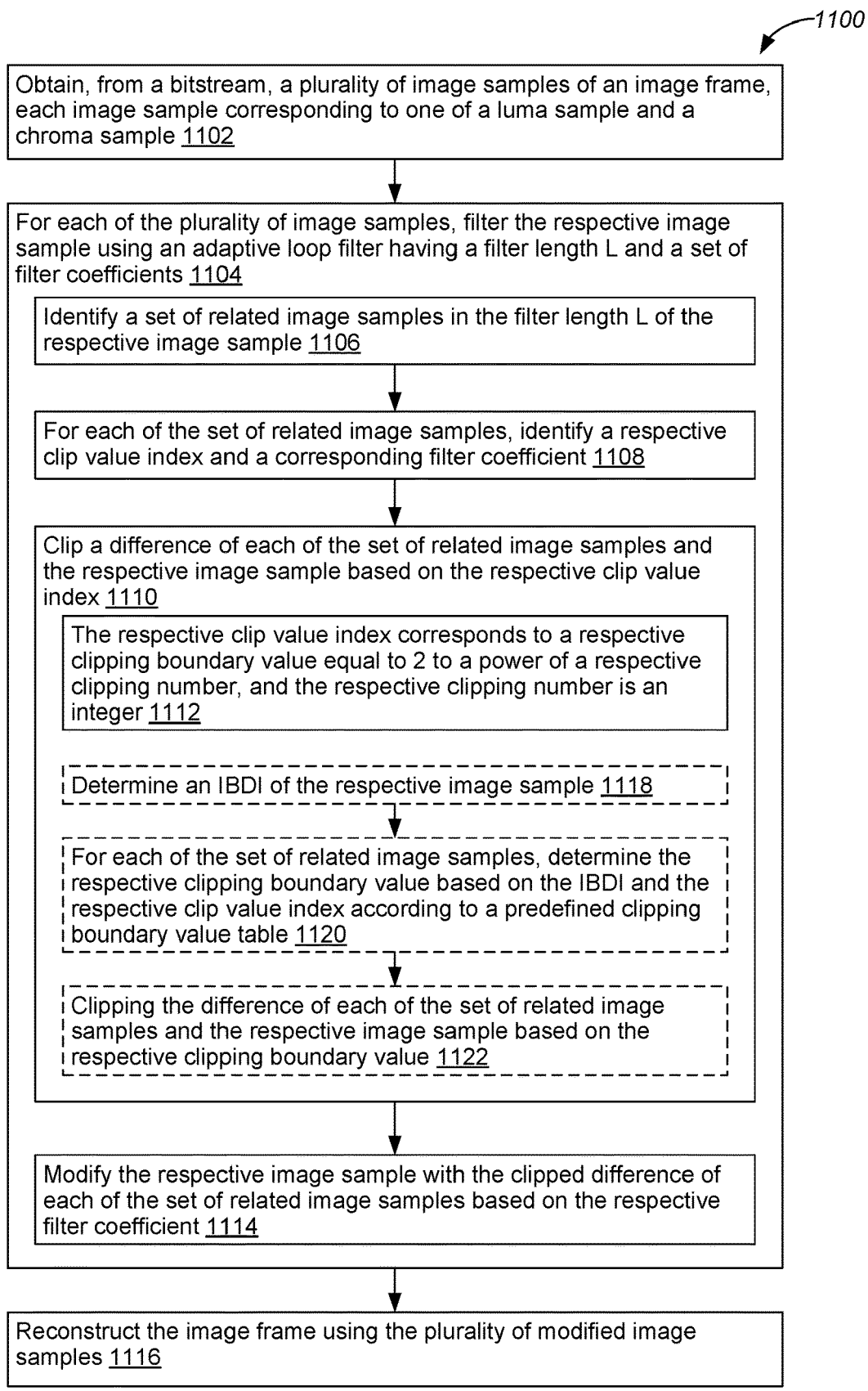
FIG. 11 is a flow chart of a video coding method, in accordance with some embodiments.

FIG. 11 is a flow chart of a video coding method 1100, in accordance with some embodiments. The video coding method 1100 is implemented in an electronic device having a video encoder 20 or decoder 30. The electronic device obtains (1102), from a bitstream, a plurality of image samples 802 of a video frame. Each image sample 802 corresponds to one of a luma sample 502 and a chroma sample 504. For each of the plurality of image samples 802, the respective image sample 802 is filtered (1104) using an adaptive loop filter 604 having a filter length L and a set of filter coefficients. Specifically, the electronic device identifies (1106) a set of related image samples 804 in the filter length L of the respective image sample 802. For each of the set of related image samples 804, a respective clip value index and a corresponding filter coefficient are identified (1108). A difference of each of the set of related image samples 804 and the respective image sample 802 is clipped (1110) based on the respective clip value index. The respective clip value index corresponds (1112) to a respective clipping boundary value equal to 2 to a power of a respective clipping number i, and the respective clipping number i is an integer. The electronic device modifies (1114) the respective image sample 802 with the clipped difference of each of the set of related image samples 804 based on the respective filter coefficient. The video frame is reconstructed (1116) using the plurality of modified image samples 802. In some embodiments, the plurality of image samples 802 forms a block of the video frame. The block is optionally the entire video frame, a slice, a brick, a tile, a tile group, a coding tree or any of other coding units.

In some embodiments, for each image sample 802, an IBDI of the respective image sample 802 is determined (1118). For each of the set of related image samples 804, the electronic device determines (1120) the respective clipping boundary value based on the IBDI and the respective clip value index according to a predefined clipping boundary value table 900. The difference of each of the set of related image samples 804 and the respective image sample 802 is clipped (1122) based on the respective clipping boundary value. Further, in some embodiments, the predefined clipping boundary value table 900 is obtained with the bitstream. Alternatively, in some embodiments, the predefined clipping boundary value table 900 is extracted from a local memory. The local memory may store a plurality of clipping boundary value tables (e.g., a subset or all of the tables 900A-99C), the predefined clipping boundary value table 900 is selected from the plurality of clipping boundary value tables. Examples of the predefined clipping boundary value table 900 is shown in FIGS. 9A-9C.

In some embodiments, for each image sample 802, an IBDI of the respective image sample 802 is determined. For each of the set of related image samples 804, the electronic device determines the respective clipping boundary value based on the IBDI and the respective clip value index according to a predefined clipping boundary value formula. The difference of each of the set of related image samples 804 and the respective image sample 802 is clipped based on the respective clipping boundary value. The predefined clipping boundary value formula is represented as one of formulas (2)-(4).

In some embodiments, wherein for each of the set of related image samples, the clip value index is selected from a plurality of consecutive numbers (e.g., 0, 1, 2, and 3). The respective clipping number i is a function of at least the clipping value index, i.e., varies with the clipping value index. Also, the respective clipping number i is linearly related to the IBDI for each clip value index. For example, when the clip value index is equal to 0, the respective clipping number i is equal to the IBDI, and when the clip value index is equal to 3, the respective clipping number i is equal to the IBDI subtracted by 7.

In some embodiments, for each of the set of related image samples, the clipped difference of the respective related image sample is in a range of $[-2^i, 2^i-1]$.

In some embodiments, for each of the set of related image samples, the clipped difference of the respective related image sample is in one of a plurality of ranges including $[-2^i+1, 2^i]$, $[-2^i, 2^i]$, and $[-2^i+1, 2^i-1]$.

In some embodiments, clipping the difference of each of the set of related image samples and the respective image sample includes only logical AND operations and/or logic OR operations.

In some embodiments, the plurality of image samples includes a subset of luma samples 502A and a subset of chroma samples 504A. The subset of luma samples 502A corresponds to a first set of clip value indexes defining a respective clip value index of each of a set of related luma samples 502B in a first filter length $L_1$ of each luma sample 502A. The subset of chroma samples 504A corresponds to a second set of clip value indexes defining a respective clip value index of each of a set of related chroma samples 504B in a second filter length $L_2$ of each chroma sample 504A. The second set of clip value indexes distinct from the first set of clip value indexes. Further, in some embodiments, each set of the first and second sets of clip value indexes corresponds to a clipping boundary value table or formula, which associates each clip value index in the respective set of clip value indexes with the respective clipping boundary value based on an IBDI. Additionally, in some embodiments, the clipping boundary value table or formula corresponding to the first or second set of clip value indexes is selected from a predefined number of clipping boundary value tables or formulas. Further, in some embodiments, wherein the first and second sets of clip value indexes correspond to a first clipping boundary value table/formula and a second value table/formula that is distinct from the first clipping boundary value table/formula.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method for decoding video data, comprising:
   obtaining, from a bitstream, a plurality of image samples of a video frame, each image sample corresponding to one of a luma sample and a chroma sample;
   for each of the plurality of image samples, filtering a respective image sample of the plurality of image samples using an adaptive loop filter having a filter length L and a set of filter coefficients, further including:
   identifying a set of related image samples of the respective image sample;
   for each of the set of related image samples, identifying a respective clip value index and a corresponding filter coefficient;
   clipping a difference between the each of the set of related image samples and the respective image sample based on the respective clip value index, wherein the respective clip value index corresponds to a respective clipping boundary value equal to 2 to a power of a respective clipping number, and the respective clipping number is an integer; and
   modifying the respective image sample with the clipped difference between the each of the set of related image samples and the respective image sample based on the respective filter coefficient.

2. The method of claim 1, wherein for the each image sample, the clipping the difference based on the respective clip value index comprises:
   determining an internal bit depth index (IBDI) of the respective image sample;
   for the each of the set of related image samples, determining the respective clipping boundary value based on the IBDI and the respective clip value index according to a predefined clipping boundary value table; and
   clipping the difference between the each of the set of related image samples and the respective image sample based on the respective clipping boundary value.

3. The method of claim 2, further comprising:
   obtaining the predefined clipping boundary value table with the bitstream.

4. The method of claim 2, further comprising:
   extracting the predefined clipping boundary value table from a local memory.

5. The method of claim 4, wherein the local memory stores a plurality of clipping boundary value tables, the method further comprising:
   selecting the predefined clipping boundary value table from the plurality of clipping boundary value tables.

6. The method of claim 2, wherein the predefined clipping boundary value table is represented as one of the following three tables:

|      | clip value index | | | |
| --- | --- | --- | --- | --- |
| IBDI | 0 | 1 | 2 | 3 |
| 8 | 256 | 64 | 8 | 2 |
| 9 | 512 | 128 | 16 | 4 |
| 10 | 1024 | 256 | 32 | 8 |
| 11 | 2048 | 512 | 64 | 16 |
| 12 | 4096 | 1024 | 128 | 32 |
| 13 | 8192 | 2048 | 256 | 64 |

-continued

| | clip value index | | | |
|---|---|---|---|---|
| IBDI | 0 | 1 | 2 | 3 |
| 14 | 16384 | 4096 | 512 | 128 |
| 15 | 32768 | 8192 | 1024 | 256 |
| 16 | 65536 | 16384 | 2048 | 512 |

| | clip value index | | | |
|---|---|---|---|---|
| IBDI | 0 | 1 | 2 | 3 |
| 8 | 256 | 64 | 16 | 2 |
| 9 | 512 | 128 | 32 | 4 |
| 10 | 1024 | 256 | 64 | 8 |
| 11 | 2048 | 512 | 128 | 16 |
| 12 | 4096 | 1024 | 256 | 32 |
| 13 | 8192 | 2048 | 512 | 64 |
| 14 | 16384 | 4096 | 1024 | 128 |
| 15 | 32768 | 8192 | 2048 | 256 |
| 16 | 65536 | 16384 | 4096 | 512 |

| | clip value index | | | |
|---|---|---|---|---|
| IBDI | 0 | 1 | 2 | 3 |
| 8 | 256 | 32 | 8 | 2 |
| 9 | 512 | 64 | 16 | 4 |
| 10 | 1024 | 128 | 32 | 8 |
| 11 | 2048 | 256 | 64 | 16 |
| 12 | 4096 | 512 | 128 | 32 |
| 13 | 8192 | 1024 | 256 | 64 |
| 14 | 16384 | 2048 | 512 | 128 |
| 15 | 32768 | 4096 | 1024 | 256 |
| 16 | 65536 | 8192 | 2048 | 512 |

7. The method of claim 1, wherein for the each image sample, the clipping the difference based on the respective clip value index comprises:

determining an internal bit depth index (IBDI) of the respective image sample;

for the each of the set of related image samples, determining the respective clipping boundary value based on the IBDI and the respective clip value index according to a predefined clipping boundary value formula; and clipping the difference between the each of the set of related image samples and the respective image sample based on the respective clipping boundary value;

wherein the predefined clipping boundary value formula is represented as one of the following formulas:

$$CBV = \begin{cases} 2^{IBDI}, & CVI = 0 \\ 2^{IBDI-2}, & CVI = 1 \\ 2^{IBDI-5}, & CVI = 2 \\ 2^{IBDI-7}, & CVI = 3 \end{cases};$$

$$CBV = \begin{cases} 2^{IBDI}, & CVI = 0 \\ 2^{IBDI-2}, & CVI = 1 \\ 2^{IBDI-4}, & CVI = 2 \\ 2^{IBDI-7}, & CVI = 3 \end{cases}; \text{ and}$$

$$CBV = \begin{cases} 2^{IBDI}, & CVI = 0 \\ 2^{IBDI-3}, & CVI = 1 \\ 2^{IBDI-5}, & CVI = 2 \\ 2^{IBDI-7}, & CVI = 3 \end{cases};$$

where CVI is the respective clip value index, and CBV is the respective clipping boundary value for the each of the set of related image samples.

8. The method of claim 1, wherein for the each of the set of related image samples, the clip value index is selected from 0, 1, 2, and 3, and the respective clipping number i is a function of at least the clip value index.

9. The method of claim 1, wherein for the each of the set of related image samples, the clipped difference of the respective related image sample is in a range of $[-2^i, 2^i-1]$.

10. The method of claim 1, wherein for the each of the set of related image samples, the clipped difference between the respective related image sample and the respective image sample is in one of a plurality of ranges including $[-2^i+1, 2^i]$, $[-2^i, 2^i]$, and $[-2^i+1, 2^i-1]$, wherein i is the respective clipping number.

11. The method of claim 1, wherein clipping the difference of the each of the set of related image samples and the respective image sample includes only logical AND operations and/or logic OR operations.

12. The method of claim 1, wherein:

the plurality of image samples includes a subset of luma samples and a subset of chroma samples;

the subset of luma samples corresponds to a first set of clip value indexes defining a respective clip value index of each of a set of related luma samples in a first filter length $L_1$ of each luma sample; and the subset of chroma samples corresponds to a second set of clip value indexes defining a respective clip value index of each of a set of related chroma samples in a second filter length $L_2$ of each chroma sample, the second set of clip value indexes distinct from the first set of clip value indexes.

13. The method of claim 12, wherein each set of the first and second sets of clip value indexes corresponds to a clipping boundary value table or formula, which associates each clip value index in a respective set of clip value indexes with the respective clipping boundary value based on an internal bit depth increase (IBDI).

14. The method of claim 13, further comprising:

selecting the clipping boundary value table or formula from a predefined number of clipping boundary value tables or formulas.

15. The method of claim 12, wherein the first and second sets of clip value indexes correspond to a first clipping boundary value table/formula and a second value table/formula that is distinct from the first clipping boundary value table/formula.

16. An electronic device, comprising:

one or more processors; and memory having instructions stored thereon, which when executed by the one or more processors cause the processors to perform a method for decoding video data including:

obtaining, from a bitstream, a plurality of image samples of a video frame, each image sample corresponding to one of a luma sample and a chroma sample;

for each of the plurality of image samples, filtering a respective image sample using an adaptive loop filter having a filter length L and a set of filter coefficients, further including:
- identifying a set of related image samples of the respective image sample;
- for each of the set of related image samples, identifying a respective clip value index and a corresponding filter coefficient;
- clipping a difference between the each of the set of related image samples and the respective image sample based on the respective clip value index, wherein the respective clip value index corresponds to a respective clipping boundary value equal to 2 to a power of a respective clipping number, and the respective clipping number is an integer; and
- modifying the respective image sample with the clipped difference between the each of the set of related image samples and the respective image sample based on the respective filter coefficient.

17. The electronic device of claim 16, wherein for the each image sample, the clipping the difference based on the respective clip value index comprises:
- determining an internal bit depth index (IBDI) of the respective image sample;
- for the each of the set of related image samples, determining the respective clipping boundary value based on the IBDI and the respective clip value index according to a predefined clipping boundary value table; and
- clipping the difference between the each of the set of related image samples and the respective image sample based on the respective clipping boundary value.

18. The electronic device of claim 16, wherein, for the each image sample, the clipping the difference based on the respective clip value index comprises:
- determining an internal bit depth index (IBDI) of the respective image sample;
- for the each of the set of related image samples, determining the respective clipping boundary value based on the IBDI and the respective clip value index according to a predefined clipping boundary value formula; and
- clipping the difference between the each of the set of related image samples and the respective image sample based on the respective clipping boundary value;
- wherein the predefined clipping boundary value formula is represented as one of the following formulas:

$$CBV = \begin{cases} 2^{IBDI}, & CVI = 0 \\ 2^{IBDI-2}, & CVI = 1 \\ 2^{IBDI-5}, & CVI = 2 \\ 2^{IBDI-7}, & CVI = 3 \end{cases};$$

$$CBV = \begin{cases} 2^{IBDI}, & CVI = 0 \\ 2^{IBDI-2}, & CVI = 1 \\ 2^{IBDI-4}, & CVI = 2 \\ 2^{IBDI-7}, & CVI = 3 \end{cases}; \text{ and}$$

$$CBV = \begin{cases} 2^{IBDI}, & CVI = 0 \\ 2^{IBDI-3}, & CVI = 1 \\ 2^{IBDI-5}, & CVI = 2 \\ 2^{IBDI-7}, & CVI = 3 \end{cases};$$

where CVI is the respective clip value index, and CBV is the respective clipping boundary value for the each of the set of related image samples.

19. A non-transitory computer-readable medium, having instructions stored thereon, which when executed by one or more processors cause the processors to perform a method for decoding video data including:
- obtaining, from a bitstream, a plurality of image samples of a video frame, each image sample corresponding to one of a luma sample and a chroma sample;
- for each of the plurality of image samples, filtering a respective image sample using an adaptive loop filter having a filter length L and a set of filter coefficients, further including:
  - identifying a set of related image samples of the respective image sample;
  - for each of the set of related image samples, identifying a respective clip value index and a corresponding filter coefficient;
  - clipping a difference between the each of the set of related image samples and the respective image sample based on the respective clip value index, wherein the respective clip value index corresponds to a respective clipping boundary value equal to 2 to a power of a respective clipping number, and the respective clipping number is an integer; and
  - modifying the respective image sample with the clipped difference between the each of the set of related image samples and the respective image sample based on the respective filter coefficient.

20. The non-transitory computer-readable medium of claim 19, wherein for the each image sample, the clipping the difference based on the respective clip value index comprises:
- determining an internal bit depth index (IBDI) of the respective image sample;
- for the each of the set of related image samples, determining the respective clipping boundary value based on the IBDI and the respective clip value index according to a predefined clipping boundary value table; and
- clipping the difference between the each of the set of related image samples and the respective image sample based on the respective clipping boundary value.

* * * * *

UNITED STATES PATENT AND TRADEMARK OFFICE
CERTIFICATE OF CORRECTION

Page 1 of 1

PATENT NO. : 12,003,729 B2
APPLICATION NO. : 17/852230
DATED : June 4, 2024
INVENTOR(S) : Yi-Wen Chen et al.

It is certified that error appears in the above-identified patent and that said Letters Patent is hereby corrected as shown below:

In the Claims

In Column 26:
Claim 1, Lines 10-12, "a respective image sample of the plurality of image samples" should read -- a respective image sample --.

Signed and Sealed this
Sixteenth Day of July, 2024

Katherine Kelly Vidal
*Director of the United States Patent and Trademark Office*